Aug. 6, 1968  L. C. KUN  3,395,949

GAS-BEARING ASSEMBLY

Filed July 16, 1964  3 Sheets-Sheet 1

INVENTOR.
LESLIE C. KUN
BY John C. LeDeuer
ATTORNEY

Aug. 6, 1968  L. C. KUN  3,395,949
GAS-BEARING ASSEMBLY
Filed July 16, 1964  3 Sheets-Sheet 2
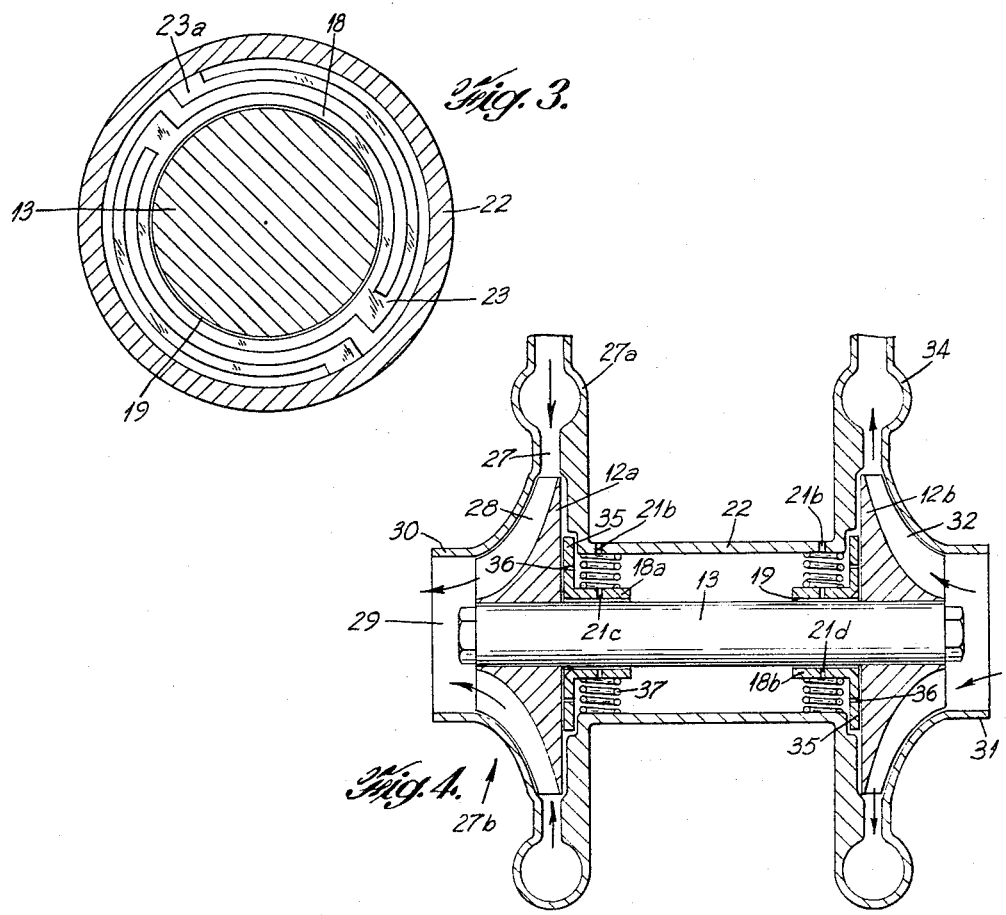
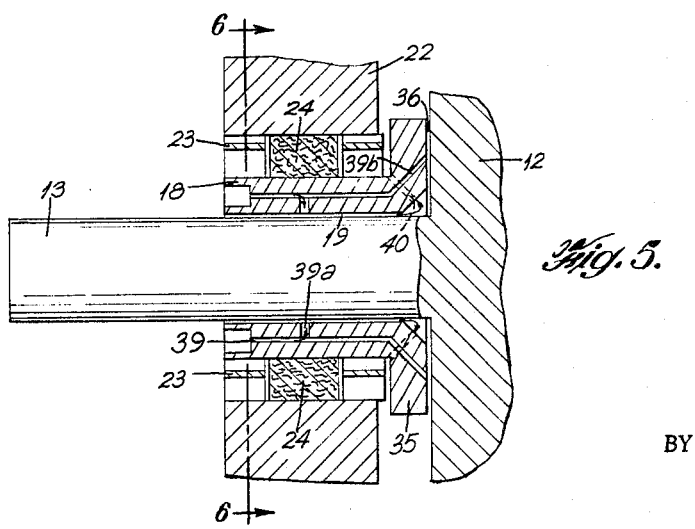
INVENTOR.
LESLIE C. KUN
BY John C. LeDever
ATTORNEY Aug. 6, 1968  L. C. KUN  3,395,949
GAS-BEARING ASSEMBLY
Filed July 16, 1964  3 Sheets-Sheet 3
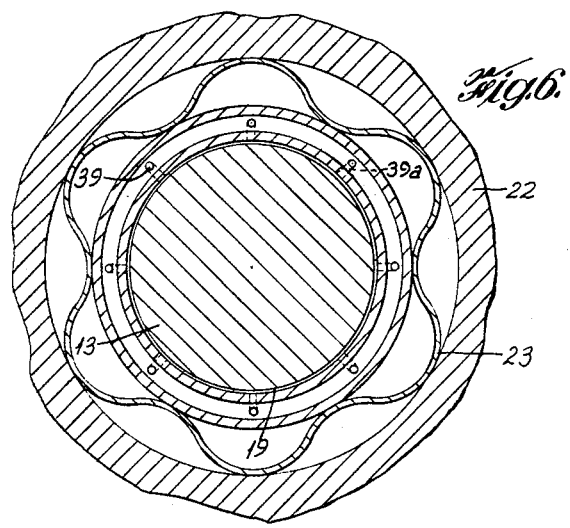
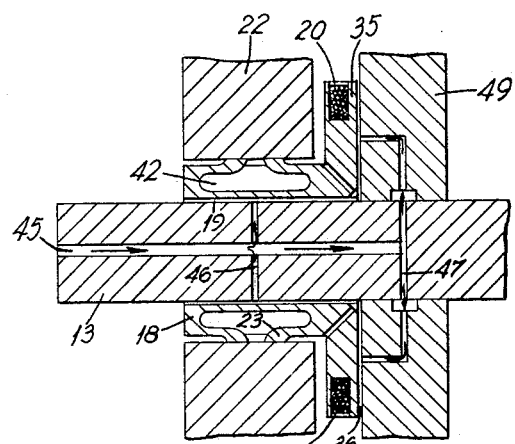
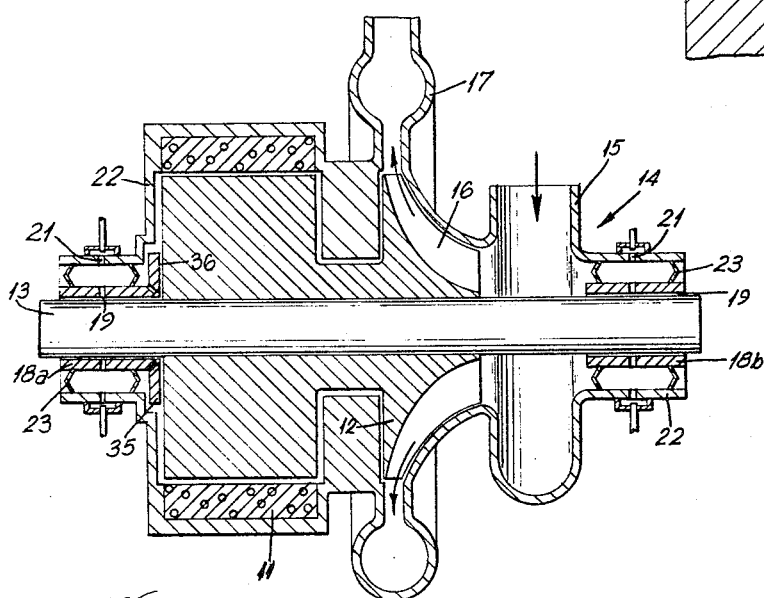
INVENTOR.
LESLIE C. KUN
BY John C. Ledner
ATTORNEY U̇nited States Patent Office 3,395,949
Patented Aug. 6, 1968

3,395,949
GAS-BEARING ASSEMBLY
Leslie C. Kun, Williamsville, N.Y., assignor to Union
Carbide Corporation, a corporation of New York
Filed July 16, 1964, Ser. No. 383,005
16 Claims. (Cl. 308—9)

This invention relates to gas-lubricated or gas-bearing supported assemblies for rotating members.

It has long been recognized that gas-lubricated bearing systems potentially offer important advantages over liquid-lubricated rotating systems. For example, the latter are limited to relatively low rotational speeds; high speeds cause overheating and failure of the bearing. Liquid-lubricated bearing systems often present a problem of contamination of the process fluid with lubricant, as for example in food processing machinery. Also, the lubricant itself may become contaminated, such as with radioactive gases in nuclear equipment. Another limitation of liquid-lubricating systems is possible freezeup in low temperature service, e.g., expansion turbines, or chemical decomposition at high temperatures. All of these disadvantages are avoidable in gas-lubricated bearing support systems.

Unfortunately, previously employed gas-bearing systems are plagued with several types of instability phenomena which tend to prevent high speed operation, even if excessive lubricating gas consumption is allowed to provide a stiffer lubricating film.

Two kinds of gas-bearing instabilities are the most troublesome, synchronous whirl and half-frequency or self-excited whirl. The synchronous whirl is due to mechanical unbalance. If the geometric and gravity axes of the rotating member do not coincide, whirling of the geometric axis can be observed as the rotors, especially at higher speeds, tend to rotate about their inertial (gravity) axis. Because the running clearance of a gas-lubricated bearing system is very small (on the order of 0.5–1 mil), the deviation between the two axes must be kept at a very low value. This may not be a particularly serious problem where a simple cylindrical one-piece shaft is supported on two journal bearings because dynamic or even static balancing is usually sufficient to produce suitably small imbalance. However, most turbo-machinery rotors are quite complex and may consist of numerous pieces. For example, the shaft bearing-impeller system of one commercially used air expansion turbine consists of more than a dozen pieces. Even if the rotor is balanced initially, during operation the various parts may shift their relative position as experimental evidence has proved.

Other causes of synchronous whirl in prior art gas-lubricated bearing support systems include uneven strains on non-isotropic materials, uneven creep rate of highly stressed rotors, uneven erosion of rotor parts by entrained solids in the working fluid, dimensional instability due to aging, and the presence of thermal gradients in the rotor. These effects may combine and cause severe unbalance. To demonstrate the centrifugal forces due to a possible unbalance, a gas-bearing system having a rotor weight of 80 pounds, a shaft speed of 36,000 r.p.m., and an eccentricity of 0.0005-inch will develop an unbalance force of over 1,400 pounds. Obviously, the gas film would not be able to carry this greatly increased load. Seizure between the shaft and bushing would occur.

The other common form of gas-bearing instability, namely half-frequency or self-excited whirl, is induced by the relative velocity between the shaft and bushing or sleeve, and is sustained by the gas film forces therebetween. The threshold of the circular frequency of the whirl is usually calculated as:

$$W = R\sqrt{k/m}$$

where

W = whirl threshold.
R = whirl ratio. The usual value is 2 or greater. It is considered to be constant for a given gas bearing and rotational speed, but is a function of the system geometry and other factors.
k = spring constant of the lubricating gas film.
m = mass of the rotor.

The half-frequency whirl is very vexing as it usually occurs below the desired operating speed, and the orbiting amplitude increases very suddenly without warning. Limited evidence also suggests that near the critical frequency or self-excited whirl threshold, the gas-lubricated bearing is extremely sensitive to external excitations. In one experiment a slight tap on the bench where the rotating equipment was located was enough to cause immediate seizure of the bearing surfaces.

To avoid these aforementioned difficulties, various remedies have been proposed and tested by the prior art. These include increasing the whirl ratio by breaking up the symmetry of the gas film, as for example with longitudinal grooves, noncircular holes and separate thrust pads. Another approach has been to increase the gas film stiffness by preloading, increasing the shaft diameter, optimizing the radial clearance, and increasing the gas supply pressure. A further method is the use of resonant cavities.

All of these possible remedies have disadvantages. For example, longitudinal grooves tend to decrease the gas film stiffness and most of the other methods increase the lubricating gas consumption to an uneconomically high level. Furthermore, they do not solve the aforementioned instability problems due to synchronous whirl.

It is an object of this invention to provide an improved gas-lubricated bearing assembly which prevents contact between the shaft and sleeve due to synchronous whirl.

Another object is to provide an improved gas-lubricated bearing system which eliminates contact between the shaft and sleeve due to self-excited or half-frequency whirl in the desired operating range.

A further object is to provide an improved gas-lubricated bearing system with stability at high rotating speeds and yet relatively low consumption of lubricating gas.

A still further object of the invention is to provide a gas-bearing support assembly where the radial and thrust bearing surfaces are integrated such that if the rotor is deflected, all elements, i.e., rotor, radial and thrust bearing, move substantially together because of the elastic suspension system used. Such an arrangement would eliminate a complicated gimbal joint or pivoted support of the thrust bearing and/or difficult alignment procedures.

Other objects and advantages will be apparent from the ensuing description, the appended claims and the drawings in which:

FIG. 3 is an end view of the FIG. 2 assembly taken along the line 3—3;

FIG. 4 is an elevation view taken in cross-section of another embodiment comprising a turbine-driven compressor with overhung rotors and thrust-bearing sections;

FIG. 5 is an enlarged longitudinal view taken in cross-section of a rigid sleeve-metallic elastic support-damping member assembly similar to FIG. 4 but differing in certain constructional details;

FIG. 6 is an end view of the FIG. 5 assembly taken along the line 6—6;

FIG. 7 is an enlarged longitudinal view taken in cross-section of an assembly similar to FIG. 5 but illustrating an alternative gas supply arrangement and employing damping means in the thrust bearing section; and FIG. 8 is a cross-sectional elevation view of a still different form of the invention using a single thrust-bearing surface.

In the drawings, corresponding elements are identified by the same reference numeral for convenience of the reader.

Figure 1:
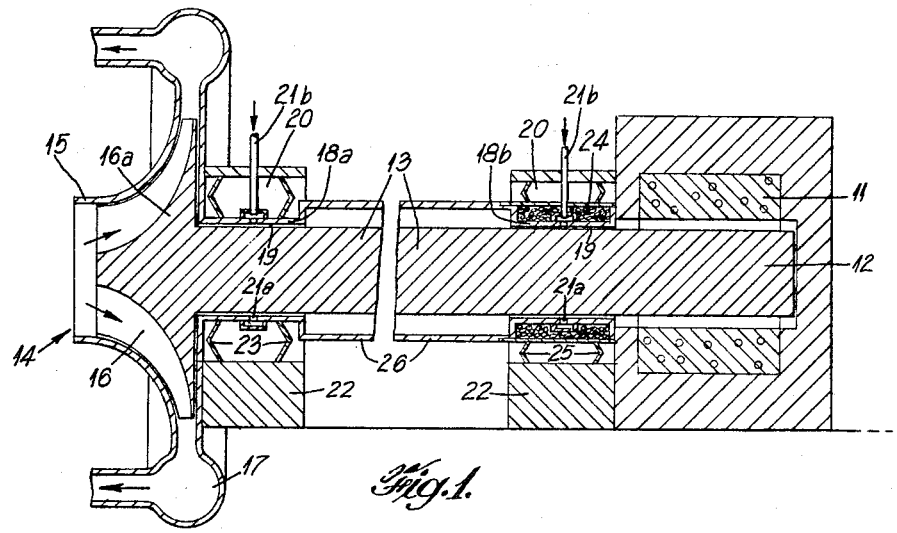
FIG. 1 is an elevation view taken in cross-section of a gas-lubricated bearing assembly in the form of an electric motor-driven compressor constructed in accordance with this invention.

According to one embodiment, a rotor wheel is mounted on a rotatable shaft and means are provided for imparting rotational speed of at least 2000 r.p.m. to the shaft. A rigid sleeve support member surrounds at least a longitudinal section of the shaft and is sized to form a narrow annular space between the inner surface of the sleeve and the outer surface of the shaft. This space preferably has a radial dimension of less than about 0.0015-inch per inch of shaft diameter. Means are also provided for introducing sufficient gas into this annular space to form a stiff gas film which supports and radially positions the shaft within the sleeve. Metallic elastic primary support means are contiguously associated with the sleeve, and a rigid secondary support member is contiguously associated with and supports the metallic elastic support. Finally, means are available for receiving at least part of the energy of rotation from the rotor. As used hereinafter, the term "rotor" includes the entire rotating unit, and may consist of one or more wheels mounted on a shaft, or alternatively may consist of wheel and shaft as an integral unit having shaft or journal portions which are supported within bearing sleeves by elastic support means.

It is important to recognize that the gas-bearing assembly of this invention employs metal for fabrication of the elastic support means for the rigid sleeve. This is because metals do not undergo substantial change in physical properties and are not subject to chemical decomposition or deformation when exposed to hostile environments such as extreme low (below —50° C.) or extreme high (above 300° C.) temperature levels, or in radioactive environment or strongly acidic or basic conditions. Rubber or other elastomeric materials are adversely affected by such environments, and are usually too soft to provide adequate elastic support for high speed rotating shafts. Rubber and similar materials are also subject to fatigue and/or aging which makes sustained proper alignment difficult. They may be satisfactory for some mechanical systems where dimensional relationships and clearances may vary over the operating life of the system. In marked contrast, the present assembly provides very close fits between rotor and housings, seals and the like, which do not change during use. For example during operation, a rubber O-ring elastic support member might distort under any of the above-mentioned environments to the extent that the radial clearance could be eliminated with consequent binding. Under operating conditions, it is preferred that the radial deflection of the metal elastic support means of the instant gas-bearing apparatus be less than about four times the radial clearance between the rotor and sleeve. This is because relatively soft elastic supports (such as rubber with a deflection-to-clearance ratio greater than 4) would create shaft seal eccentricity and/or mis-alignment during operation and prevent maintaining desirably close clearances between moving and stationary parts.

Large eccentricities are particularly undesirable because the gas leakage rate through the seals will increase with greater eccentricity. These problems are avoided by the use of metal elastic supports.

It is also preferred that in operation, the stiffness of the elastic support means be at least about 0.1 the stiffness of the gas film upon application of a given load normal to the rotor axis. Stated in another manner, the elastic support is constructed so as to experience a deflection of ten times or less than the gas film clearance when exposed to the same force. A smaller stiffness ratio of elastic support means to the gas film would occur if soft rubber of other elastomers were employed for construction of the elastic support means, and should be avoided for the above-discussed reasons of shaft seal alignment and close clearances.

The metallic elastic support means may, for example, take the form of radial springs, chevron-shaped circular springs or springs of the leaf, Bellville washer and helical types. Still another alternative is a magnetic suspension assembly employing oppositely positioned magnets to maintain central alignment. A further suitable elastic support means consists of metallic felt or mat layers of a randomly interlocked structure of fibers sintered to produce bonding.

The metal selected for construction of the elastic support means should be compatible with the intended operating conditions, and preferably possesses a relatively high modulus of elasticity and no measureable creep. Suitable materials include stainless steels, aluminum alloys, titanium and copper bearing alloys such as beryllium-copper.

The metal elastic support means do not contribute appreciable damping. It is known that in the analysis of many vibrating systems the damping properties of metallic springs are neglected. For any set of design parameters, e.g., mass and stiffness ratios and degree of unbalance, the present bearing system will be stable up to a certain speed without any damping of the support. It has also been established that very high rotating speeds can be reached due to the minor inherent damping only of the metal springs or supports. This is important because it is mechanically difficult to provide certain metal elastic support means with damping means. On the other hand, for rotors having substantial unbalance the resulting vibration amplitudes may be kept small (i.e., less than bearing clearance) by employing separate energy dissipation or damping means in addition to the metallic elastic support means. It was found that separating the elastic support and the damping means allows the optimization of both factors independently. Accordingly, one embodiment of the invention contemplates damping means contiguously associated with the rigid sleeve support member and separate from the elastic support means. Such damping means are mechanically connected to the elastically supported bearing sleeve, but need not be coextensive with it. For example, separate damping means may be incorporated into either radial or thrust bearing portions of an elastically supported bearing sleeve. Such damping means are preferably in the form of metal particles having high density and low yield strength, e.g., lead shots partially filling a cavity. These are hysteresis-type dampers where the kinetic energy is converted to heat with friction by non-elastic or partially-elastic collisions. Other types of dashpots may also be employed, e.g., the resilient support members may have overlaying telescoping layers, in which case the dissipating mechanism would be the so-called Coulomb friction. The aforementioned metal damping means are particularly advantageous where the bearing support system is exposed to extreme environmental surrounding, i.e., very low or very high temperature levels.

Referring now to the drawings and in particular FIG. 1, electrical energy is received by an electric motor having field coils 11 and imparts a speed of at least 2000 r.p.m. to rotor 12 incorporating rotatable shaft 13. At least part of this energy is transferred by means of shaft 13 to gas entering compressor 14 through suction casing 15 spaced longitudinally and at the shaft end opposite from rotor 12. The gas flows through passageway 16 in compressor wheel 16a and leaves through discharge casing 17. That is, rotor 12 contains means for receiving the rotational energy, i.e., compressor wheel passageways 16. The compressor 14 could be in the form of a gas blower or a liquid pump, either of which may for example act to dissipate shaft power as a fluid brake.

Alternatively, rotor 12 may receive energy from a fluid such as the high pressure discharge of a gas compressor. This energy may be transferred from the high pressure fluid through the rotor operating as a turbine and delivered as electrical energy from a generator. This construction is essentially opposite that illustrated in FIG. 1. As used herein, the term "generator" includes equipment used either for producing useful electrical power or for dissipating the energy by electric means such as eddy current brakes.

Shaft 13 is supported from longitudinally spaced bearing sleeves 18a and 18b by a gas film in narrow annular spaces 19 between the sleeve inner surface and the shaft outer surface, with a diametral clearance of about 0.001 inch per inch of shaft diameter. Whereas the bearing sleeves are illustrated as cylinders, they could assume other configurations such as conical or barrel-shapes, as long as they are circular in cross-section. Each sleeve 18a and 18b has a cavity section 20 with radial passageway 21a extending therethrough and communicating with annular space 19. Superambient pressure gas is introduced through each radial passageway 21b in rigid secondary support member 22 and then through passageway 21a into annular space 19 to maintain a relatively stiff gas film therein which supports shaft 13 within sleeves 18 and 18b.

Longitudinally separated bearing sleeves 18a and 18b act as primary support members for shaft 13 and are flexibly mounted and positioned from rigid secondary support members 22 by metallic elastic support means 23. The latter are illustrated as chevron-shaped metal, e.g., stainless steel circular springs fitting within cavity sections 20.

Whereas the bearing sleeve 18a nearest compressor 14 employs only metal elastic support member 23, the bearing sleeve 18b nearest rotor 12 additionally employs damping means in the form of metal particles 24 having high density and low yield strength, e.g., lead shots. These particles are preferably retained in sleeve cavity section 20. Relatively small chevron-shaped metal circular springs 25 act as separate elastic support members and bear against sleeve 18b on the inner circumference and rigid secondary support member 22 on the outer circumference. FIG. 1 shows different types of bearing support constructions for each sleeve, and this is for illustrative purposes only. In assemblies for commercial use it is preferable to employ the same type of support system for each bearing so as to minimize alignment problems and avoid possible instabilities. Also in FIG. 1, the two bearing sleeves 18a and 18b are spaced apart but mechanically joined by connector section 26 for improved alignment.

Figure 2:
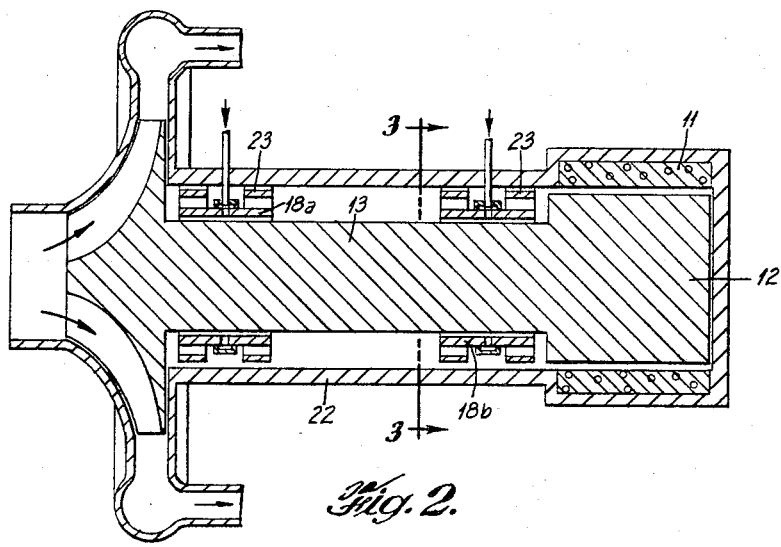
FIG. 2 is an elevation view taken in cross-section of another embodiment similar to FIG. 1 but employing radial springs as metallic elastic support means.

FIGS. 2 and 3 illustrate another electric motor-driven compressor similar to the FIG. 1 embodiment but employing longitudinally spaced multiple radial springs positioned parallel to the axis of shaft 13 as the elastic support means 23. As shown in the FIG. 3 end view, radial springs 23 have at least two outer projections or prongs 23a bearing against outer casing 22 as the rigid secondary support member. The inner portion of radial springs 23 is integral with bearing sleeves 18. Alternatively, radial springs 23 may be structurally separate from longitudinal bearing sleeves 18a and 18b but contiguously associated therewith for support and positioning. The FIG. 2–3 embodiment also differs from FIG. 1 in that bearing sleeves 18a and 18b are not mechanically joined, and separate damping means are not provided.

FIG. 4 illustrates a turbine-driven compressor unit employing another embodiment of the novel gas bearing support system. External energy is supplied in the form of relatively high pressure gas introduced through nozzle 27 in the inlet casing 27a of turbine 27b to contact turbine wheel passages 28 at first rotor wheel 12a and exhaust at lower pressure through passageway 29 into discharge casing 30. This energy is transferred by shaft 13 to second rotor wheel 12b which in turn transfers at least part of the energy to gas entering through the suction casing 31. The gas is pressurized in flowing through passageways 32 in second rotor wheel 12b and discharged into discharge casing 34. Sleeves 18a and 18b are positioned at opposite ends of shaft 13 and substantially concentrically positioned with respect to the axis of rotation of the shaft with narrow annular spaces 19 therebetween.

Thrust bearing sections 35 are provided at opposite ends of shaft 13 and positioned adjacent to the inner end of rotor wheels 12a and 12b with narrow annular spaces 36 therebetween having a width of less than about 0.010 inch. Thrust bearing sections 35 are normal to and preferably integral with bearing sleeves 18 so as to form the sleeve inner end. In this manner, narrow annular spaces 19 and 36 are in direct communication and normal to each other. Gas at above-ambient pressure is introduced through radial passageways 21b in outer casing 22 and then through connecting conduits (not shown) to passageways 21c and 21d in sleeve 18 and thrust sections 35, respectively, into spaces 19 and 37 to form gas films therein for supporting rotating shaft 13 in both the lateral and longitudinal directions. The longitudinally spaced sleeves 18 are supported by elastic helical metal springs 37 bearing on one end against the sleeves and on the other end against outer casing 22 as the rigid secondary support member for the elastic springs.

Although FIG. 4 illustrates an embodiment in which two wheels and two thrust bearing surfaces are employed, a similar apparatus, described hereinafter and illustrated in FIG. 8, may be constructed according to the principles of this invention in which only one thrust bearing section is needed. This is because the thrust forces can be arranged to be exerted in one direction only.

In the FIG. 5 and 6 embodiment, corrugated metal springs 23 positioned normal to the axis of shaft 13 constitute the elastic support means. As illustrated in FIG. 6, corrugated springs 23 bear against rigid secondary support 22 on the outer side and against the sleeve primary support member 18 on their innermost surface. Springs may, for example, be radially aligned on opposite sides of ring-shaped damping means 24. The latter may be formed of metallic felt or mat layers consisting of a randomly interlocked structure of metallic fibers, e.g., stainless steel, sintered to produce bonding of contacting fibers and having low density.

In FIG. 5, the superambient pressure gas is introduced through passageways 39 extending substantially parallel to rotatable shaft 13 from the end of bearing sleeve 18 towards thrust bearing section 35. Gas supply-manifold passageway 39 continues into thrust bearing section 35 normal to sleeve section 18 where it connects to passageways 39b and emerges into narrow annular space 36 between thrust bearing section 35 and the inner surface of rotor 12. Following the flow of superambient pressure gas introduced through passageway 39, a portion is discharged through connecting radial passageway 39a into annular space 19 thereby establishing a relatively stiff gas film to laterally support shaft 13 and rotor 12. Another portion is discharged through connecting angular passageway 39b into annular space 36 thereby establishing a stiff gas film normal to the axis of shaft 13 which stabilizes the shaft and rotor against end thrusts. A portion of the pressurized gas in annular space 19 is discharged through exit passageway 40. The various flow directions of the supporting gas are indicated by arrows, with a portion of the bearing support gas being removed through passage 40.

In FIG. 7, radial springs 23 are aligned parallel to the axis of shaft 13 as the elastic support means for bearing sleeve 18, the springs being retained in hollowed portion 42 of the sleeve and bearing against rigid secondary support 22. Separate damping means in the form of metallic particles or shots 24 are retained in hollow portion 20 of thrust bearing member which is oriented normal to the axis of rotation. In this embodiment the damping means resists both radial and longitudinal movement of the shaft-rotor assembly and is located normal to the axis of rotation, whereas the FIGS. 1 and 5–6 damping means are oriented parallel to the axis of rotation.

The bearing support gas in the FIG. 7 embodiment is introduced through central passageway 45 extending longitudinally through rotatable shaft 13, and a portion of such gas is directed through first radial passageways 46 to narrow annular space 19 between the shaft and bearing sleeve 18. The remainder of the pressurized support gas flows past first radial passageways 46 to second radial passageways 47 communicating with passages 48 in thrust collar 49. The remaining gas is then discharged into narrow annular space 36 bounded by thrust bearing section 35 and collar 49. The lubricating gas discharge flow paths within these spaces are similar to those previously described in conjunction with FIG. 5.

FIG. 8 shows an electric motor-driven compressor with the instant gas-bearing assembly and including a single thrust bearing section 35 at one end of rotatable shaft 13 instead of at both shaft ends as illustrated in FIG. 4. This is possible because the thrust forces are arranged to be exerted in one direction only, i.e. toward the thrust bearing surfaces. This embodiment is similar in all other respects to FIG. 4, and the construction will not be described in detail. In operation, electrical energy is received by an electric motor having field coils 11 and imparts a speed of at least 2000 r.p.m. to rotor 12 mounted on rotatable shaft 13. At least part of this energy is transferred by means of shaft 13 to gas entering compressor 14 through suction casing 15 spaced longitudinally and at the shaft end opposite motor 12. The gas flows through passageway 16 and leaves through discharge casing 17. Alternatively, rotor 12 may receive energy from a fluid such as the high pressure discharge of a gas compressor. This energy may be transferred from the high pressure fluid through the rotor operating as a turbine and delivered to electrical energy from a generator. This construction is essentially opposite that illustrated in FIG. 8.

In summary, the present gas bearing assembly employs a novel elastic support system having a relatively high stiffness which keeps the rotor concentrically positioned with respect to the surrounding components, e.g., shaft seals, field housing coils, housings and the like. The support system also increases the threshold of self-excited whirl to a speed appreciably above that obtainable with fixed support systems, and also safely above the desired operating speed. These advantages are achieved without increasing the lubricating gas consumption to an uneconomically high level.

The gas-bearing assembly has been specifically described in terms of externally pressurized or hydrostatic type bearings, but the same support principles are applicable to the self-acting or hydrodynamic type bearings in which the gas film is provided from the surrounding atmosphere. As is well understood in the art, hydrodynamic systems may be started under friction conditions using, for example, self-lubricated surfaces.

Although preferred embodiments have been described in detail, it will be recognized that obvious modifications and variations may be practiced without departing from the spirit and scope of the invention.

For example, other arrangements of the bearings relative to the rotor wheel components (turbine or compressor wheels) may be used as desired. Although two bearings will usually be used to elastically support a shaft, one bearing may be used in a cantilevered arrangement, or three or even more bearings may be used to support a particular design rotor. Also, if desired, the rotor may be oriented in a substantially vertical position with the thrust bearing usually located at the lower end.

What is claimed is:
1. A gas bearing assembly comprising:
 (a) a rotor having a rotatable shaft portion;
 (b) means for imparting speed of at least 2000 r.p.m. to said rotor;
 (c) a rigid sleeve primary support member surrounding at least a longitudinal section of said shaft portion and sized to provide a narrow annular space between the inner surface of said sleeve and the outer surface of said shaft;
 (d) means for introducing sufficient gas into said annular space to for a stiff gas film which supports and radially positions said shaft from said sleeve;
 (e) a multiplicity of chevron-shaped metal circular springs with their axes aligned parallel to the axis of shaft rotation, having inner edges contiguously associated with and in load-bearing relation to the outer surface of said sleeve as elastic support means;
 (f) a rigid secondary support member for and contiguously associated with the outer edges of said chevron-shaped circular metal springs; and
 (g) means for receiving at least part of the energy of rotation from said motor.

2. A gas bearing assembly comprising:
 (a) a rotor having a rotatable shaft portion;
 (b) means for imparting speed of at least 2000 r.p.m. to said rotor;
 (c) a rigid sleeve primary support member surrounding at least a longitudinal section of said shaft and sized to provide a narrow annular space between the inner surface of said sleeve and the outer surface of said shaft, and at least one recessed cavity in the sleeve;
 (d) means for introducing sufficient gas into said annular space to form a stiff gas film which supports and radially positions said shaft from said sleeve;
 (e) metallic elastic support means for and contiguously associated with said sleeve;
 (f) a multiplicity of metal particles having high density and low yield strength entirely within and partially filling said recessed cavity as damping means for and contiguously associated with said rigid sleeve support member being separate from said elastic support means;
 (g) a rigid secondary support member for said elastic support means and said damping means; and
 (h) means for receiving at least part of the energy of rotation from said rotor.

3. A gas bearing assembly comprising:
 (a) a rotor having a rotatable shaft portion;
 (b) means for imparting speed of at least 2000 r.p.m. to said rotor;
 (c) a rigid sleeve primary support member surrounding at least a longitudinal section of said shaft and sized to provide a narrow annular space between the inner surface of said sleeve and the outer surface of said shaft, and at least one recessed cavity in the sleeve;
 (d) means for introducing sufficient gas into said annular space to form a stiff gas film which supports and radially positions said shaft from said sleeve;
 (e) metallic elastic support means for and contiguously associated with said sleeve;
 (f) a multiplicity of hysteresis-type yieldable metal damping members within said recessed cavity whereby kinetic energy is converted to heat with friction by collisions between said members;

(g) a rigid secondary support member for said elastic support means and said damping members; and (h) means for receiving at least part of the energy of rotation from said rotor.

4. A gas bearing assembly according to claim 3 in which said metallic elastic support means is arranged and constructed such that its radial deflection is less than about four times the radial clearance between said rotor and sleeve primary support member.

5. A gas bearing assembly according to claim 3 in which said metallic elastic support means is arranged and constructed such that its stiffness is at least about 0.1 the stiffness of said gas film upon application of a given load normal to the rotor axis.

6. A gas bearing assembly according to claim 3 in which said metallic elastic support means is arranged and constructed such that (a) its radial deflection is less than about four times the radial clearance between said rotor and sleeve primary support member, and (b) its stiffness is at least about 0.1 the stiffness of said gas film upon application of a given load normal to the rotor axis.

7. A gas bearing assembly according to claim 2 in which lead shots comprise said metal particles.

8. A gas bearing assembly comprising:
(a) a rotor wheel portion mounted on the end of a rotatable shaft;
(b) means for imparting speed of at least 2000 r.p.m. to said rotor;
(c) a rigid sleeve primary support member surrounding at least a longitudinal section of said shaft and sized to provide a first narrow annular space between the inner surface of said sleeve and the outer surface of said shaft having a radial dimension of less than about 0.0015 inch per inch of shaft diameter; a thrust bearing section forming the end of said sleeve support member adjacent to the inner surface of said wheel and spaced therefrom to form a second narrow annular space normal to said first annular space having a width of less than about 0.010 inch; and at least one recessed cavity in the sleeve;
(d) means for introducing sufficient gas into said first annular space to form a stiff first gas film which supports and radially positions said shaft from said sleeve;
(e) means for introducing sufficient gas into said second annular space to establish a second gas film transmitting the thrust load from said rotor to said thrust bearing section;
(f) metallic elastic support means for and contiguously associated with said sleeve;
(g) a multiplicity of hysteresis-type yieldable metal damping members within said recessed cavity whereby kinetic energy is converted to heat with friction by collisions between said members;
(h) a rigid secondary support member for said elastic support means; and
(i) means for receiving at least part of the energy of rotation from said rotor.

9. A gas bearing assembly according to claim 8 in which lead shot particles comprises said hysteresis-type yieldable damping members.

10. A gas bearing assembly according to claim 8 in which radial circular springs comprise said metallic elastic support means and lead shot particles comprise said hysteresis-type yieldable damping members.

11. A gas bearing assembly according to claim 1 in which said gas introduced into said annular space is at superambient pressure.

12. A gas bearing assembly according to claim 3 in which said gas introduced into said annular space is at superambient pressure.

13. A gas bearing assembly according to claim 8 in which said gas introduced into said first annular space and said second annular space is at superambient pressure.

14. A gas bearing assembly comprising:
(a) a rotor having a rotatable shaft portion;
(b) means for imparting speed of at least 2000 r.p.m. to said rotor;
(c) a rigid sleeve primary support member surrounding at least a longitudinal section of said shaft portion and sized to provide a narrow annular space between the inner surface of said sleeve and the outer surface of said shaft;
(d) means for introducing sufficient gas into said annular space to form a stiff gas film which supports and radially positions said shaft from said sleeve;
(e) a multiplicity of radial circular metal springs aligned parallel to the axis of shaft rotation, having inner portions contiguously associated with and in load-bearing relation to the outer surface of said sleeve as elastic support means;
(f) a rigid secondary support member for and contiguously associated with the outer portions of said radial circular metal springs; and
(g) means for receiving at least part of the energy of rotation from said rotor.

15. A gas bearing assembly comprising:
(a) a rotor having a rotatable shaft portion;
(b) means for imparting speed of at least 2000 r.p.m. to said rotor;
(c) a rigid sleeve primary support member surrounding at least a longitudinal section of said shaft portion and sized to provide a narrow annular space between the inner surface of said sleeve and the outer surface of said shaft, and at least one recessed cavity in the sleeve;
(d) means for introducing sufficient gas into said annular space to form a stiff gas film which supports and radially positions said shaft from said sleeve;
(e) corrugated circular metal springs contiguously associated with said sleeve as elastic support means;
(f) a multiplicity of hysteresis-type yieldable metal damping members within said recessed cavity whereby kinetic energy is converted to heat with friction by collisions between said members;
(g) a rigid secondary support member for and contiguously associated with said corrugated circular metal springs; and
(h) means for receiving at least part of the energy of rotation from said rotor.

16. A gas bearing assembly comprising:
(a) a rotor having a rotatable shaft portion;
(b) means for imparting speed of at least 2000 r.p.m. to said rotor;
(c) a rigid sleeve primary support member surrounding at least a longitudinal section of said shaft and sized to provide a narrow annular space between the inner surface of said sleeve and the outer surface of said shaft;
(d) means for introducing sufficient superambient pressure gas into said annular space to form a stiff gas film which supports and radially positions said shaft from said sleeve;
(e) metallic elastic support means for and contiguously associated with said sleeve;
(f) an interlocked ring-shaped structure of metallic fibers as damping means for and surrounding a section of the outer surface of said sleeve;
(g) a rigid secondary support member for said elastic support means and said damping means; and
(h) means for receiving at least part of the energy of rotation from said rotor.

References Cited

UNITED STATES PATENTS

| | | | |
|---|---|---|---|
| 1,384,173 | 7/1921 | Wikander | 308—73 |
| 2,162,719 | 6/1939 | Hay | 267—1 |

(Other references on following page)

UNITED STATES PATENTS

| | | | |
|---|---|---|---|
| 2,675,225 | 4/1954 | Migney | 267—1 |
| 3,034,837 | 5/1962 | Barker | 308—9 |
| 3,058,785 | 10/1962 | Steele | 308—9 |
| 3,113,809 | 12/1963 | Eggmann | 308—26 |
| 3,162,492 | 12/1964 | Walking | 308—122 |
| 3,249,390 | 5/1966 | Schwartyman | 308—122 |

FOREIGN PATENTS

| | | |
|---|---|---|
| 12,514 | 5/1899 | Great Britain. |
| 1,113,802 | 12/1955 | France. |

MARTIN P. SCHWADRON, *Primary Examiner.*

FRANK SUSKO, *Assistant Examiner.*